(12) United States Patent
Williams, III

(10) Patent No.: US 8,856,447 B2
(45) Date of Patent: Oct. 7, 2014

(54) CONVERTING MEMORY ACCESSES NEAR BARRIERS INTO PREFETCHES

(75) Inventor: Gerard R. Williams, III, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 262 days.

(21) Appl. No.: 13/551,335

(22) Filed: Jul. 17, 2012

(65) Prior Publication Data

US 2014/0025892 A1  Jan. 23, 2014

(51) Int. Cl.
*G06F 13/00* (2006.01)

(52) U.S. Cl.
USPC ............................. 711/122; 711/132; 711/137

(58) Field of Classification Search
USPC .......................................... 711/122, 132, 137
See application file for complete search history.

(56) References Cited

U.S. PATENT DOCUMENTS

| | | |
|---|---|---|
| 6,594,730 B1 | 7/2003 | Hum et al. |
| 6,910,106 B2 | 6/2005 | Sechrest et al. |
| 6,983,356 B2 | 1/2006 | Rotithor et al. |
| 8,112,755 B2 | 2/2012 | Apacible et al. |
| 2003/0233521 A1* | 12/2003 | Pudipeddi et al. ............ 711/137 |
| 2007/0005903 A1 | 1/2007 | Lau et al. |
| 2008/0010429 A1* | 1/2008 | Rao .............................. 711/169 |

* cited by examiner

*Primary Examiner* — Reba I Elmore
(74) *Attorney, Agent, or Firm* — Rory D. Rankin; Meyertons, Hood, Kivlin, Kowert & Goetzel, P.C.

(57) ABSTRACT

Methods, apparatuses, and processors for reducing memory latency in the presence of barriers. When a barrier operation is executed, subsequent memory access operations are delayed until the barrier operation retires. While the memory access operation is delayed, the memory access operation is converted into a prefetch request and sent to the L2 cache. Then, data corresponding to the prefetch request is retrieved and stored in the L1 data cache. When the memory access operation wakes up, the data for the operation will already be stored in the L1 data cache, reducing the memory latency of the operation.

20 Claims, 8 Drawing Sheets

CONVERTING MEMORY ACCESSES NEAR BARRIERS INTO PREFETCHES

BACKGROUND

1. Field of the Invention

The present invention relates generally to processors, and in particular to methods and mechanisms for reducing memory latency in the presence of barrier instructions.

2. Description of the Related Art

In modern day processors, instructions may be executed out of order. This may improve processor performance, but it may also result in unintended behavior. For example, in some cases a programmer may intend for specific sequences of instructions to execute in order, but if the processor reorders these instructions this may result in unwanted errors. Therefore to avoid these errors, the programmer may insert barrier commands in the code to enforce a particular instruction ordering. A barrier is an instruction that has a property such that instructions that the barrier controls must not be reordered with respect to the barrier. Therefore, the barrier can be inserted into a stream of instructions to prevent some instructions from being executed before other instructions.

When a memory barrier is encountered in the code, any younger memory access instructions will be delayed until the memory barrier completes. When the memory barrier completes, the delayed memory accesses may be restarted and allowed to proceed to memory now that the barrier is finished. If these restarted memory accesses miss in the cache closest to the processor core, the memory accesses may then access the next level of cached memory, or even main memory itself. As a result, the latency of the next level memory will be exposed to the processor, essentially degrading performance of running applications due to the stalls encountered when waiting on memory.

SUMMARY

Processors, apparatus, and methods for reducing memory latency for memory accesses in the vicinity of barriers are disclosed. In an out-of-order processor, barriers may be utilized to enforce an order of execution of a sequence of instructions. When a barrier is encountered in code flow, the barrier may have restrictions on what is and is not allowed to pass it during execution of the code by the processor. For memory or synchronization barriers, these barriers are executed by the processor and are seen by a load/store unit as a barrier. This barrier may create an invisible wall for subsequent instructions, and these subsequent instructions may not be allowed to pass the barrier.

When a memory or synchronization barrier executes, younger memory accesses may be delayed from accessing memory. However, in response to determining a memory access has been delayed by a pending barrier, the younger memory access may be converted to a prefetch request. The prefetch request may then cause the data to be retrieved prior to the memory access being restarted. In this way, the data required by the memory accesses may be fetched from lower levels of cache or main memory and be available in a higher level cache when the memory access is processed after the delay.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

Figure 1:
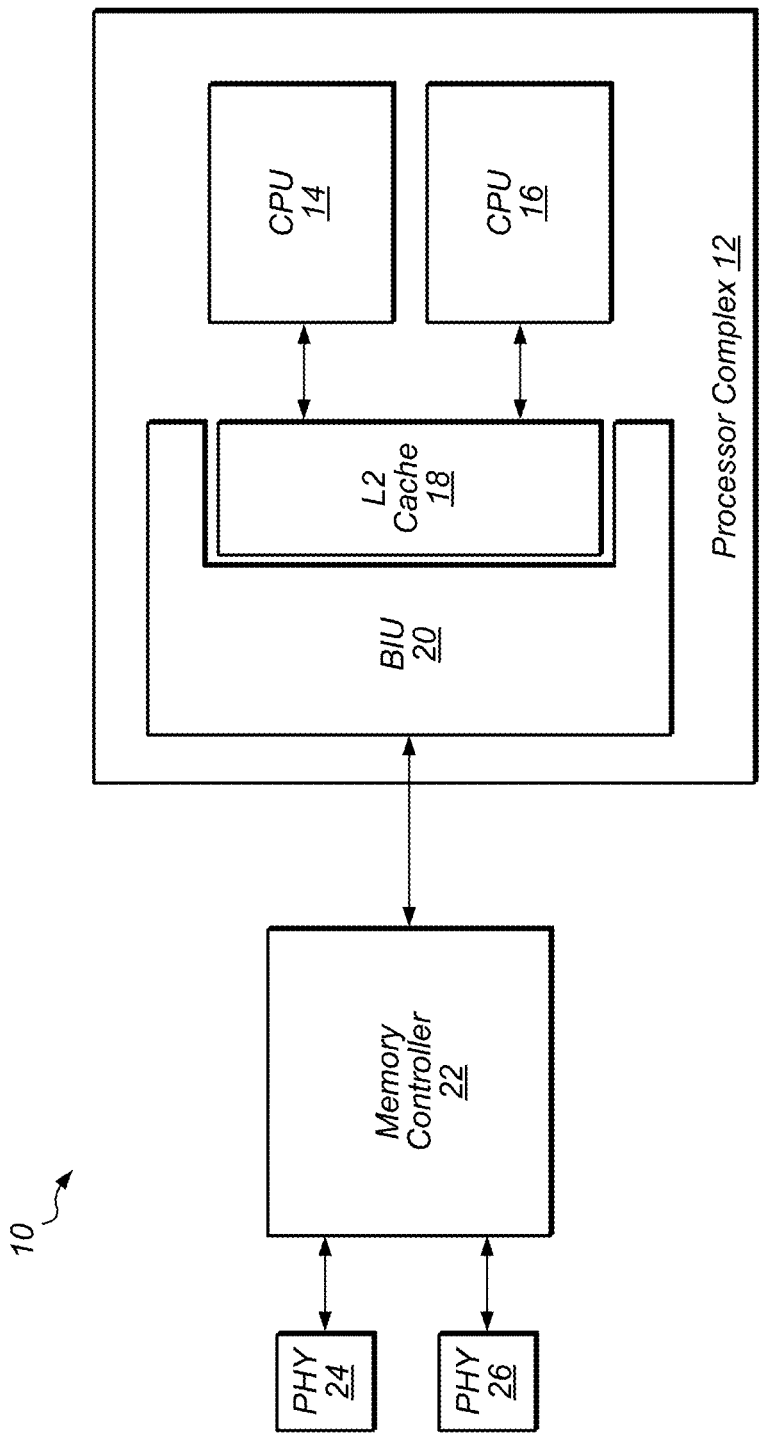
FIG. 1 illustrates one embodiment of a portion of an integrated circuit.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A processor comprising a load/store unit . . . ." Such a claim does not foreclose the processor from including additional components (e.g., a fetch unit, an execution unit).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring now to FIG. 1, a block diagram illustrating one embodiment of a portion of an integrated circuit (IC) is shown. In the illustrated embodiment, IC 10 includes a processor complex 12, memory controller 22, and memory physical interface circuits (PHYs) 24 and 26. It is noted that IC 10 may also include many other components not shown in FIG. 1. In various embodiments, IC 10 may also be referred to as a system on chip (SoC), an application specific integrated circuit (ASIC), or an apparatus.

Processor complex 12 may include central processing units (CPUs) 14 and 16, level two (L2) cache 18, and bus interface unit (BIU) 20. In other embodiments, processor complex 12 may include other numbers of CPUs. CPUs 14 and 16 may also be referred to as processors or cores. It is noted that processor complex 12 may include other components not shown in FIG. 1.

The CPUs 14 and 16 may include circuitry to execute instructions defined in an instruction set architecture. Specifically, one or more programs comprising the instructions may be executed by CPUs 14 and 16. Any instruction set architecture may be implemented in various embodiments. For example, in one embodiment, the ARM™ instruction set architecture (ISA) may be implemented. The ARM instruction set may include 16-bit (or Thumb) and 32-bit instructions. Other exemplary ISA's may include the PowerPC™ instruction set, the MIPS™ instruction set, the SPARC™ instruction set, the x86 instruction set (also referred to as IA-32), the IA-64 instruction set, etc.

Each of CPUs 14 and 16 may also include a level one (L1) cache (not shown), and each L1 cache may be coupled to L2 cache 18. Other embodiments may include additional levels of cache (e.g., level three (L3) cache). In one embodiment, L2 cache 18 may be configured to cache instructions and data for low latency access by CPUs 14 and 16. The L2 cache 18 may comprise any capacity and configuration (e.g. direct mapped, set associative). L2 cache 18 may be coupled to memory controller 22 via BIU 20. BIU 20 may also include various other logic structures to couple CPUs 14 and 16 and L2 cache 18 to various other devices and blocks.

Memory controller 22 may include any number of memory ports and may include circuitry configured to interface to memory. For example, memory controller 22 may be configured to interface to dynamic random access memory (DRAM) such as synchronous DRAM (SDRAM), double data rate (DDR) SDRAM, DDR2 SDRAM, Rambus DRAM (RDRAM), etc. Memory controller 22 may also be coupled to memory physical interface circuits (PHYs) 24 and 26. Memory PHYs 24 and 26 are representative of any number of memory PHYs which may be coupled to memory controller 22. Memory PHYs 24 and 26 may be configured to interface to memory devices (not shown).

The caches and memory devices of IC 10 may be referred to collectively as a "memory subsystem". The caches closest to the CPUs 14 and 16 may be referred to as higher-level caches and the caches closest to memory may be referred to as lower-level caches. In various embodiments, barrier operations may be executed and make their way through the higher-level caches to the lower-level caches and then down to memory. At any point in the path of the barrier operation through the memory subsystem, memory access operations may be delayed due to the establishment of the barrier operation. When memory access operations are delayed by a barrier operation, the memory access operations may be converted to prefetch requests. A prefetch may generally refer to the fetching of data from memory (or a lower level cache) before that data is actually needed for computation by instructions in the program. The conversion of memory access operations to prefetch requests may take place at any level of the memory subsystem and help reduce the memory latency experienced by IC 10.

It is noted that other embodiments may include other combinations of components, including subsets or supersets of the components shown in FIG. 1 and/or other components. While one instance of a given component may be shown in FIG. 1, other embodiments may include two or more instances of the given component.

Similarly, throughout this detailed description, two or more instances of a given component may be included even if only one is shown, and/or embodiments that include only one instance may be used even if multiple instances are shown.

Figure 2:
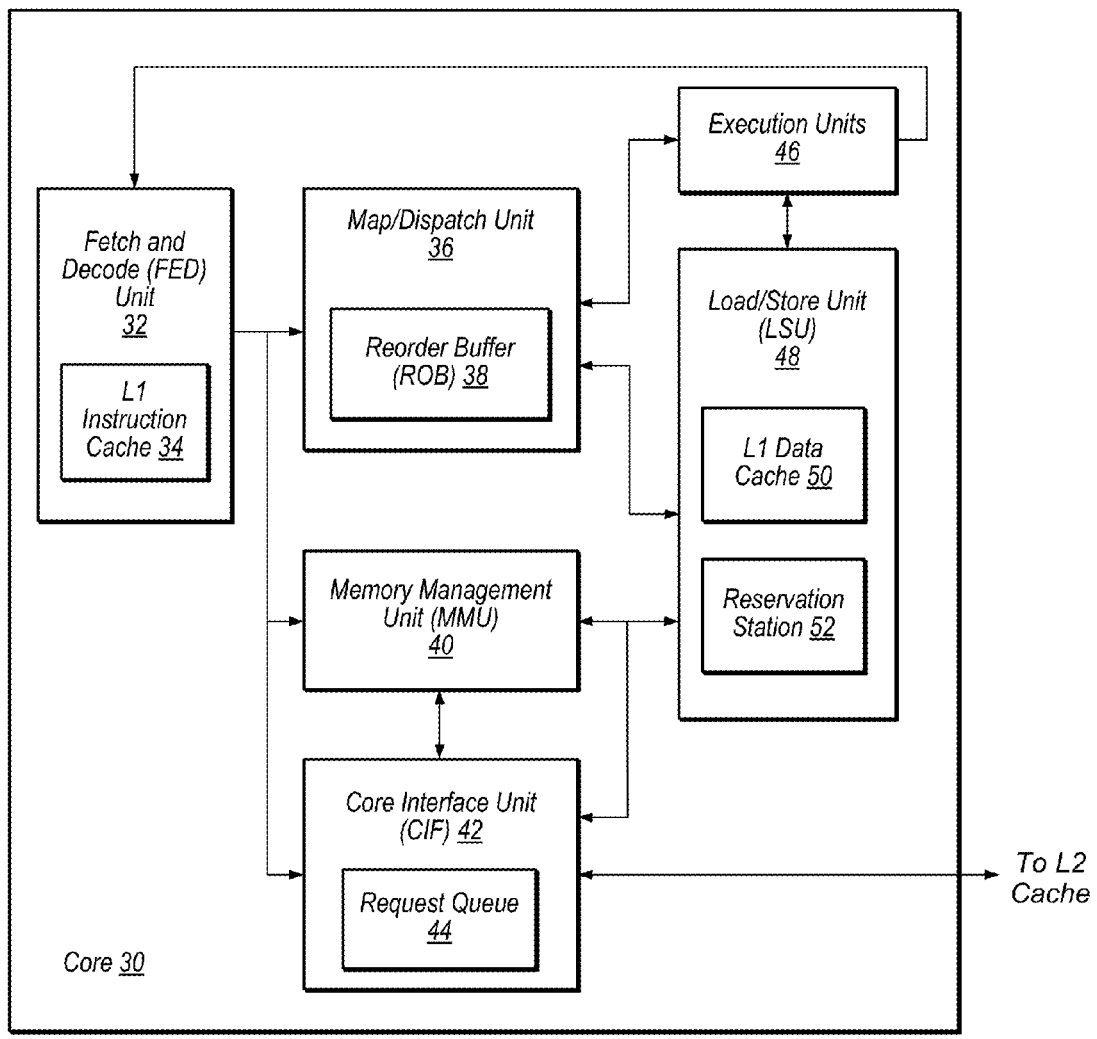
FIG. 2 is a block diagram that illustrates one embodiment of a processor core.

Turning now to FIG. 2, one embodiment of a processor core is shown. Core 30 is one example of a processor core, and core 30 may be utilized within a processor complex, such as processor complex 12 of FIG. 1. In one embodiment, each of CPUs 14 and 16 of FIG. 1 may include the components and functionality of core 30. Core 30 may include fetch and decode (FED) unit 32, map and dispatch unit 36, memory management unit (MMU) 40, core interface unit (CIF) 42, execution units 46, and load-store unit (LSU) 48. It is noted that core 30 may include other components and interfaces not shown in FIG. 2.

FED unit 32 may include circuitry configured to read instructions from memory and place them in level one (L1) instruction cache 34. L1 instruction cache 34 may be a cache memory for storing instructions to be executed by core 30. L1 instruction cache 34 may have any capacity and construction (e.g. direct mapped, set associative, fully associative, etc.). Furthermore, L1 instruction cache 34 may have any cache line size. FED unit 32 may also include branch prediction hardware configured to predict branch instructions and to fetch down the predicted path. FED unit 32 may also be redirected (e.g. via misprediction, exception, interrupt, flush, etc.).

FED unit 32 may be configured to decode the instructions into instruction operations. In addition, FED unit 32 may also be configured to decode multiple instructions in parallel. Generally, an instruction operation may be an operation that the hardware included in execution units 46 and LSU 48 is capable of executing. Each instruction may translate to one or more instruction operations which, when executed, result in the performance of the operations defined for that instruction according to the instruction set architecture. It is noted that the terms "operation", "instruction operation", and "uop" may be used interchangeably throughout this disclosure. In other embodiments, the functionality included within FED unit 32 may be split into two or more separate units, such as a fetch unit, a decode unit, and/or other units.

Decoded uops may be provided to map/dispatch unit 36. Map/dispatch unit 36 may be configured to map uops and architectural registers to physical registers of core 30. Map/dispatch unit 36 may implement register renaming to map source register addresses from the uops to the source operand numbers identifying the renamed source registers. Map/dispatch unit 36 may also be configured to dispatch uops to reservation stations within execution units 46 and LSU 48.

In one embodiment, map/dispatch unit 36 may include reorder buffer (ROB) 38. In other embodiments, ROB 38 may be located elsewhere. Prior to being dispatched, the uops may be written to ROB 38. ROB 38 may be configured to hold uops until they can be committed in order. Each uop may be assigned a ROB index (RNUM) corresponding to a specific entry in ROB 38. RNUMs may be used to keep track of the operations in flight in core 30. Map/dispatch unit 36 may also include other components (e.g., mapper array, dispatch unit, dispatch buffer) not shown in FIG. 2. Furthermore, in other embodiments, the functionality included within map/dispatch unit 36 may be split into two or more separate units, such as a map unit, a dispatch unit, and/or other units.

Execution units 46 may include any number and type of execution units (e.g., integer, floating point, vector). Each of execution units 46 may also include one or more reservation stations (not shown). CIF 42 may be coupled to LSU 48, FED unit 32, MMU 40, and an L2 cache (not shown). In one embodiment, CIF 42 may include request queue 44 for storing memory access operations that have missed in L1 instruction cache 34 or L1 data cache 50. A picker (not shown) may be configured to select from request queue 44 for conveying memory access operations to the L2 cache. Generally speaking, CIF 42 may be configured to manage the interface between core 30 and the L2 cache. MMU 40 may be configured to perform address translation and memory management functions.

LSU 48 may include L1 data cache 50 and reservation station 52. Reservation station 52 is representative of any number of reservation stations within LSU 48. LSU 48 may also be coupled to the L2 cache via CIF 42. It is noted that LSU 48 may also include other components (e.g., store queue, load queue) not shown in FIG. 2. Load and store operations and barrier operations may be dispatched from map/dispatch unit 36 to reservation station 52 in LSU 48. In the ARM ISA, barrier operations may include data memory barriers (DMBs) and data synchronization barriers (DSBs). In other ISAs, other types of barrier operations may be utilized. Depending on the parameters that are specified for a given barrier operation, the barrier may be applied to store operations only, to memory operations only, or to both store and load operations.

In one embodiment, when a younger memory access operation is issued from reservation station 52 ahead of a barrier operation, the younger memory access operation may be flushed and redirected to FED unit 32. Younger memory access operations that are issued from reservation station 52 after a barrier operation may be put into a wait-state in LSU 48 in either a load queue (not shown) or store queue (not shown). The barrier operation may not be launched from LSU 48 to CIF 42 until all older memory access operations are complete in LSU 48. Also, LSU 48 may wait until the barrier operation becomes non-speculative before sending the barrier operation to CIF 42.

An operation is older than another operation if the operation is prior to the other operation in program order. An operation is younger than another operation if it is subsequent to the other operation in program order. Similarly, operations may be indicated as being prior to or subsequent to other operations, or may be referred to as previous operations, preceding operations, subsequent operations, etc. Such references may refer to the program order of the operations.

Memory access operations, or memory operations, may be a type of instruction operation. In various embodiments, memory operations may be implicitly specified by an instruction having a memory operation, or may be derived from explicit load/store instructions. Furthermore, a "load memory operation" or "load operation" may refer to a transfer of data from memory or cache to a processor, and a "store memory operation" or "store operation" may refer to a transfer of data from a processor to memory or cache. "Load operations" and "store operations" may be more succinctly referred to herein as "loads" and "stores", respectively.

It should be understood that the distribution of functionality illustrated in FIG. 2 is not the only possible microarchitecture which may be utilized for a processor core. Other processor cores may include other components, omit one or more of the components shown, and/or include a different arrangement of functionality among the components.

Figure 3:
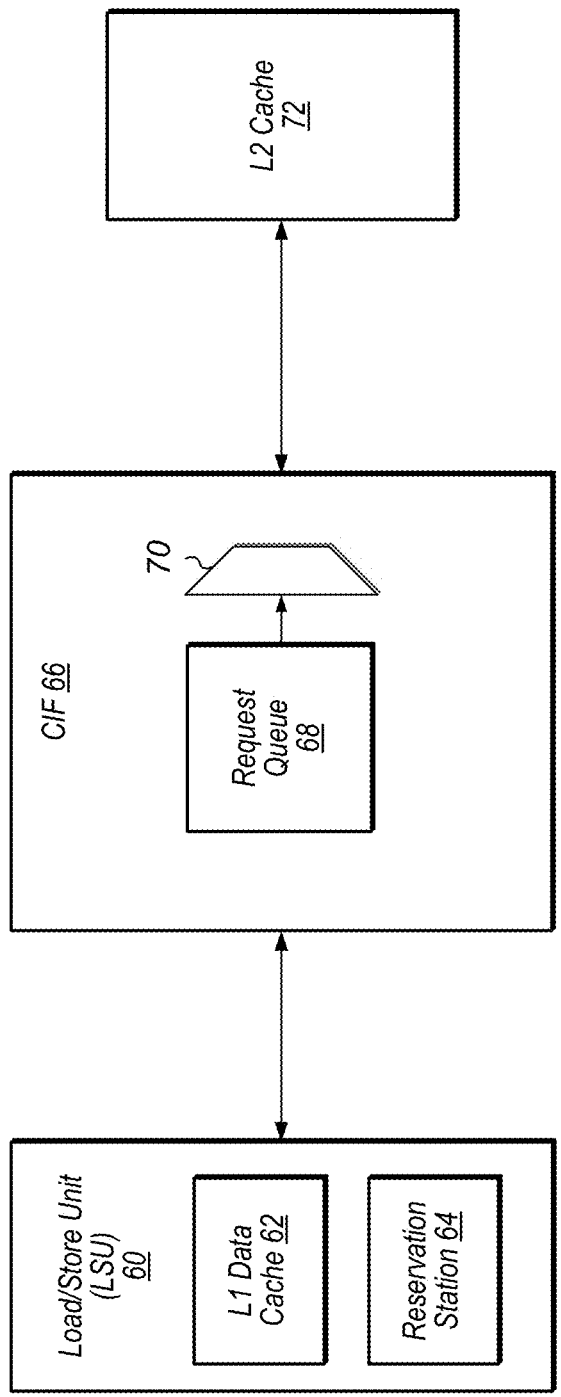
FIG. 3 is a block diagram illustrating one embodiment of a portion of a processor.

Referring now to FIG. 3, a block diagram of one embodiment of a portion of a processor is shown. In one embodiment, load/store unit (LSU) 60 may include L1 data cache 62 and reservation station 64. Reservation station 64 is representative of any number of reservation stations which may be utilized within LSU 60. LSU 60 may also include other logic not shown in FIG. 3. LSU 60 may be coupled to CIF 66, and CIF 66 may include at least a request queue 68 and request picker 70. Although not shown in FIG. 3, request queue 68 may be implemented as more than one memory structure (e.g., address array, data array, order matrix). For example, an order matrix may maintain an order of requests received by CIF 66 and stored in request queue 68. CIF 66 may also be coupled to L2 cache 72. Although not shown in FIG. 3, L2 cache 72 may also be coupled to lower levels of cache and/or main memory.

When a memory access (e.g., store operation, load operation) issues from reservation station 64 and misses in the L1 data cache 62, the memory access may be conveyed to CIF 66. Loads and stores may be enqueued in request queue 68. In addition to receiving requests from LSU 60, CIF 66 may also receive requests from a memory management unit (MMU) (not shown) and fetch and decode unit (not shown). When a barrier operation is processed by LSU 60, the barrier operation may be forwarded to CIF 66 and enqueued in request queue 68.

Generally speaking, CIF 66 may use the concept of color to label memory operations as before or after a barrier operation. For example, each operation may be associated with a specific color when it is dispatched from a map/dispatch unit (not shown). When a barrier operation is dispatched, the color may be changed, such that subsequent operations will be assigned a new color. In one embodiment, when picker 70 selects a barrier operation, then the color of the barrier operation may be established for CIF 66. When a memory access operation is detected after the barrier operation, picker 70 may compare the color of the memory access operation to the current color of CIF 66. If the colors match, then the memory access operation may proceed. If the colors are different, then the memory access operation may be rejected. In other embodiments, other schemes for determining the order of memory access operations in relation to a given barrier operation are possible and are contemplated.

When the memory access operation is rejected, the memory access operation may be converted into a prefetch request. The prefetch request may not change the architected state of the processor but may cause the data at the address identified by the memory access operation to be prefetched into the cache. The prefetch request may identify the address to be prefetched, the size of the data, and other information, and the prefetch request may be sent to L2 cache 72. The prefetch may cause data to be retrieved from L2 cache 72, lower levels of cache, or main memory, and then the data may be placed in L1 data cache 62.

The rejected memory access operation may be reactivated once the barrier operation has retired. When the barrier operation has retired, then the color of the CIF 66 may be updated, and then the memory access operations that were previously rejected may be restarted and may be replayed. When the memory access operation re-checks L1 data cache 62 for the data referenced by the operation, the data should be in L1 data cache 62 due to the prefetch request that was generated earlier. This should help minimize the memory latency that would otherwise be experienced by the processor.

Figure 4:
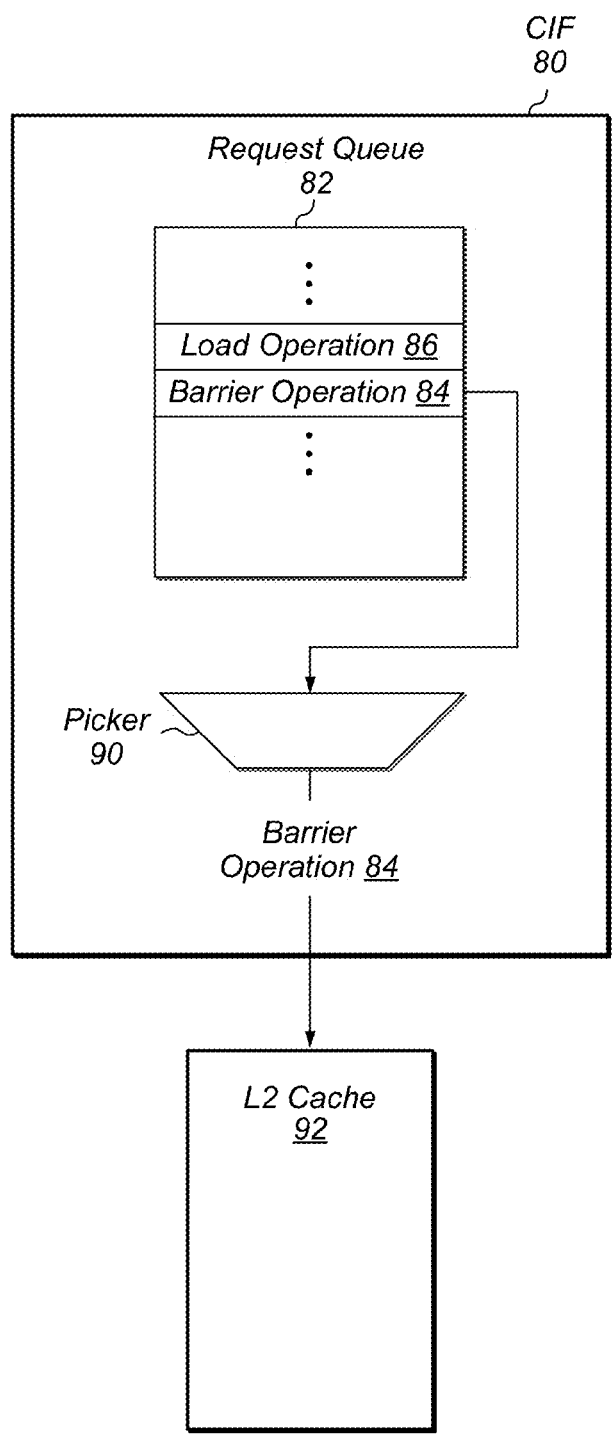
FIG. 4 is a block diagram illustrating another embodiment of a portion of a processor.

Turning now to FIG. 4, a block diagram of another embodiment of a portion of a processor is shown. In one embodiment, core interface unit (CIF) 80 may be configured to receive operations from many sources and to store the received operations in request queue 82. Picker 90 may be configured to select operations in order from request queue 82 and to convey the operations to L2 cache 92. Request queue 82 may include any number of entries depending on the embodiment. Barrier operation 84 and load operation 86 are shown in request queue 82, and these operations are representative of any number of operations that may be enqueued in request queue 82. Barrier operation 84 is representative of any type of a barrier operation. For example, in one embodiment, barrier operation 84 may be a DMB or DSB as defined by the ARM ISA. In other embodiments, for other ISAs, barrier operation 84 may be representative of other types of barrier operations.

Additionally, the entries in request queue 82 may include one or more fields of data in addition to the address associated with the operation. For example, in one embodiment, the entries in request queue 82 may include the L2 cache command, memory attribute, and information identifying the source of the request (e.g., MMU, LSU, FED). In other embodiments, the entries in request queue 82 may include other fields of information. It is assumed for the purposes of this discussion that barrier operation 84 precedes load operation 86 in program order. In other words, barrier operation 84 is older than load operation 86, and therefore, barrier operation 84 will be selected by picker 90 prior to load operation 86.

While load operation 86 is shown as being the next operation after barrier operation 84, in other embodiments, load operation 86 may be separated from barrier operation 84 by one or more operations. Once barrier operation 84 is selected by picker 90 and conveyed to L2 cache 92, the control circuitry in CIF 80 may be configured to establish barrier operation 84 in CIF 80. When a memory barrier is established by the control circuitry, all subsequent memory access operations may be delayed until the corresponding memory barrier operation is retired. There may be any number of memory access operations that are delayed due to a memory barrier operation being established.

As shown in FIG. 4, picker 90 selects barrier operation 84 from request queue 82. When barrier operation 84 is selected by picker 90, barrier operation 84 may be established by CIF 80. This will prevent any subsequent memory access operations that meet the criteria specified by barrier operation 84 from being conveyed to L2 cache 92. When the barrier operation 84 retires at a later point in time, CIF 80 will be updated and then CIF 80 will allow the delayed memory access operations to be restarted.

Figure 5:
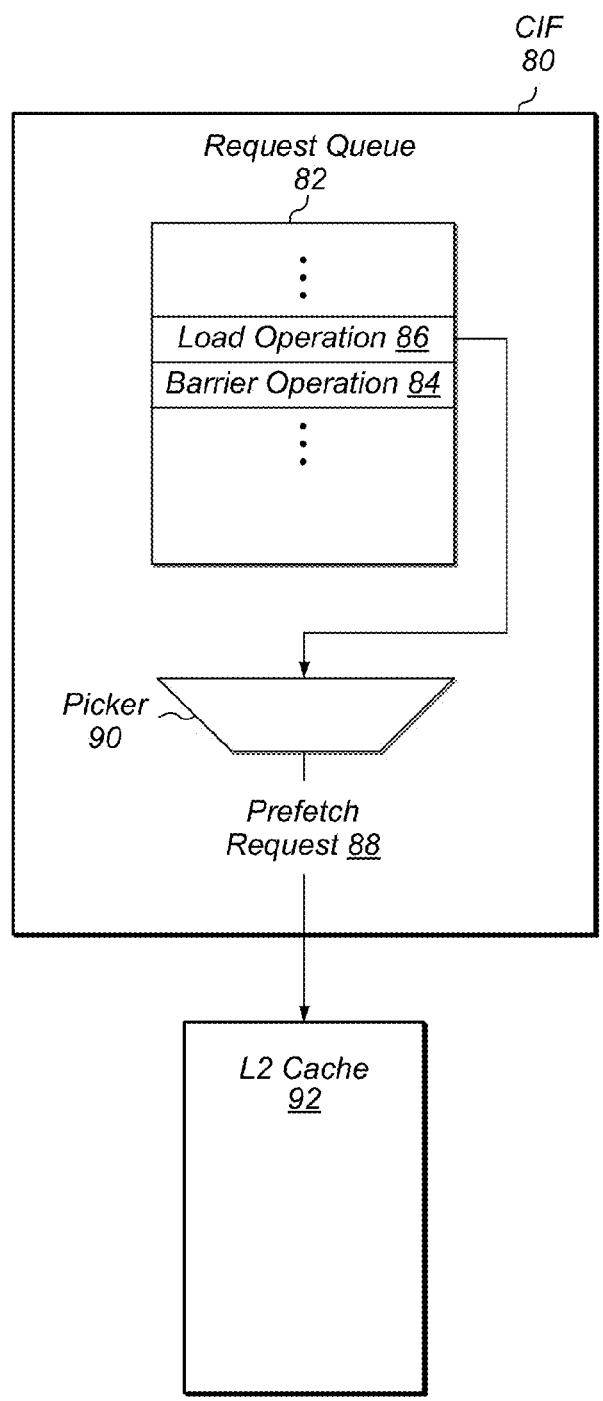
FIG. 5 illustrates one embodiment of the generation of a prefetch request.

Referring now to FIG. 5, one embodiment of the generation of a prefetch request is shown. After selecting memory barrier operation 84 in a previous clock cycle (as shown in FIG. 4), picker 90 may select load operation 86 as the next-in-line operation to be processed. In one embodiment, picker 90 may select operations based on their order in the program sequence. Although load operation 86 is shown as immediately following barrier operation 84, load operation 86 could be any number of operations behind barrier operation 84 in request queue 82. Once barrier operation 84 is established in CIF 80, then until barrier operation 84 retires and CIF 80 is notified of this event, any subsequent memory access operations may be rejected and converted into prefetch requests.

In one embodiment, when load operation 86 is selected by picker 90, picker 90 may reject load operation 86 by comparing the color of load operation 86 to the current color established for CIF 80. In this case, the colors will not match, and therefore load operation 86 will be rejected and will remain in request queue 82. When load operation 86 is rejected, prefetch request 88 may be generated and conveyed to L2 cache 92. Prefetch request 88 may grab the data that is referenced by load operation 86, and this data may be stored in the L1 cache (not shown). In one embodiment, the data may be stored in the L1 cache in a shared state. Later on, when barrier operation 84 retires, load operation 86 may wake up and be replayed through the LSU (not shown). When load operation 86 is replayed, load operation 86 may hit in the L1 cache since the data for the operation has already been retrieved by prefetch request 88. In this way, the memory latency of load operation 86 may be reduced.

It is noted that store operations may be treated in a similar manner as is described for load operation 86. Also, any other memory access operations that follow load operation 86 may be similarly converted into prefetch requests and conveyed to L2 cache 92. This conversion of memory access operations into prefetch requests may continue until barrier operation 84 retires.

In some embodiments, certain memory access operations may be allowed to proceed past an established barrier operation, depending on the specific type of barrier operation that was established. For example, a barrier operation may be established for load operations only, and therefore only subsequent load operations may be rejected in this case. If a store operation were to follow this type of barrier operation, then the store operation would be allowed to proceed to L2 cache 92.

Figure 6:
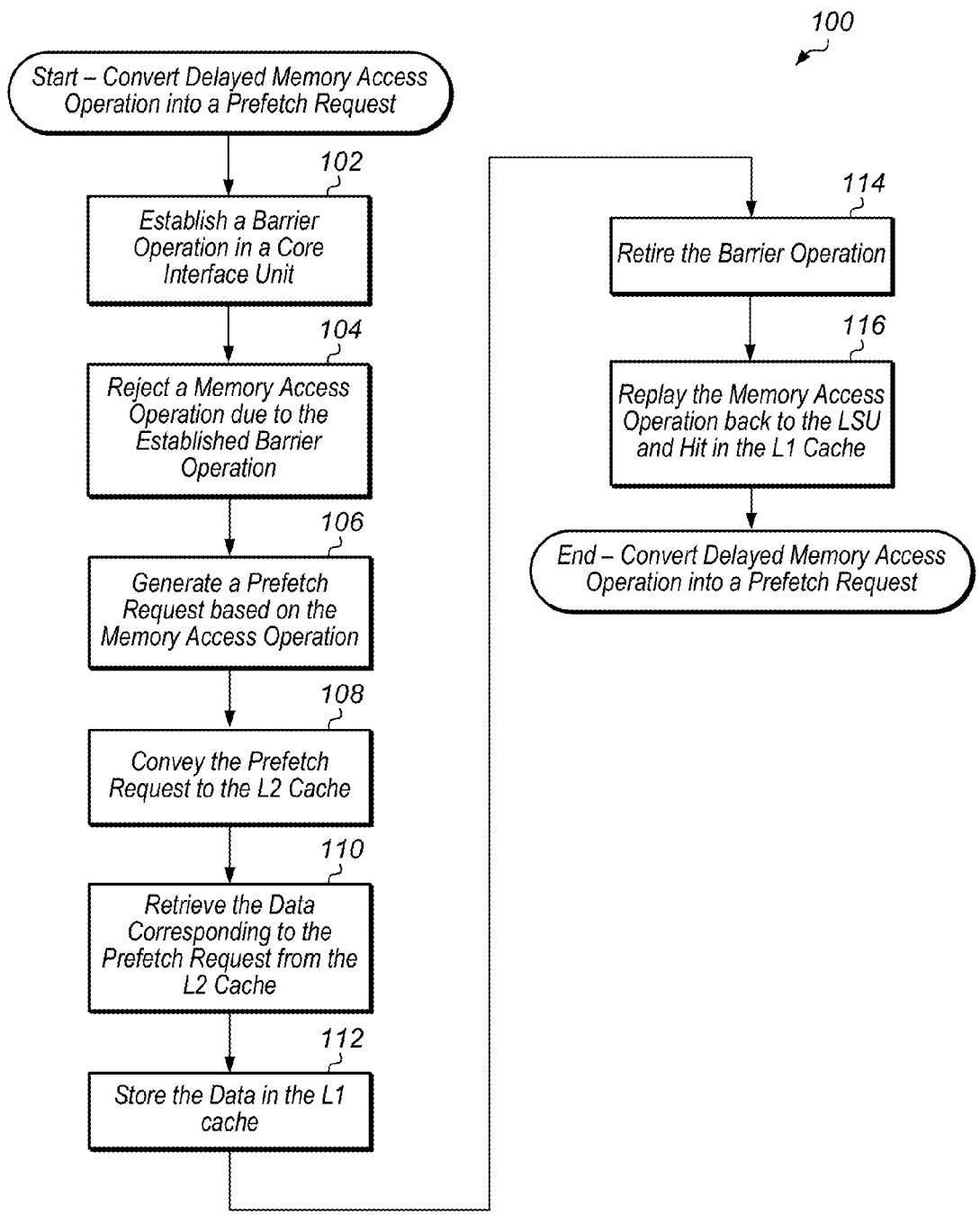
FIG. 6 is a generalized flow diagram illustrating one embodiment of a method for converting a delayed memory access operation into a prefetch request.

Turning now to FIG. 6, one embodiment of a method 100 for converting a delayed memory access operation into a prefetch request is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

In one embodiment, a barrier operation may be established by a core interface unit (CIF) (block 102). Next, a memory access operation may be rejected by the picker due to the established barrier operation (block 104). This rejected memory access operation may be a store or load which had previously missed in the L1 data cache. For example, in one embodiment, the picker may compare a color of the memory access operation to the current color of the CIF. If the colors are different, then the memory access operation may be rejected. In response to the rejection of the memory access operation, a prefetch request may be generated based on the memory access operation (block 106). Next, the prefetch request may be conveyed to the L2 cache (block 108). The memory access operation may remain stalled and remain in the request queue while the prefetch request is conveyed to the L2 cache.

Then, data corresponding to the prefetch request may be retrieved from the L2 cache (block 110). Alternatively, if the corresponding data is not in the L2 cache, the data may be retrieved from a lower-level cache or from memory. Next, the data from the prefetch request may be stored in the L1 cache (block 112). Then, at some later point in time, the barrier operation may retire (block 114). The delayed memory access operation may be replayed back to the load/store unit and then the operation may hit in the L1 cache (block 116). After block 116, method 100 may end.

While method 100 is described as being implemented for a single memory access operation, it is noted that method 100 may be performed concurrently for any number of memory access operations that are delayed due to a memory barrier operation. In other words, the steps of method 100 may be performed in parallel for any number of memory access operations. For example, in one embodiment, a single memory barrier operation may be followed by multiple memory access operations, and each of these multiple memory access operations may be converted into a prefetch request.

Figure 7:
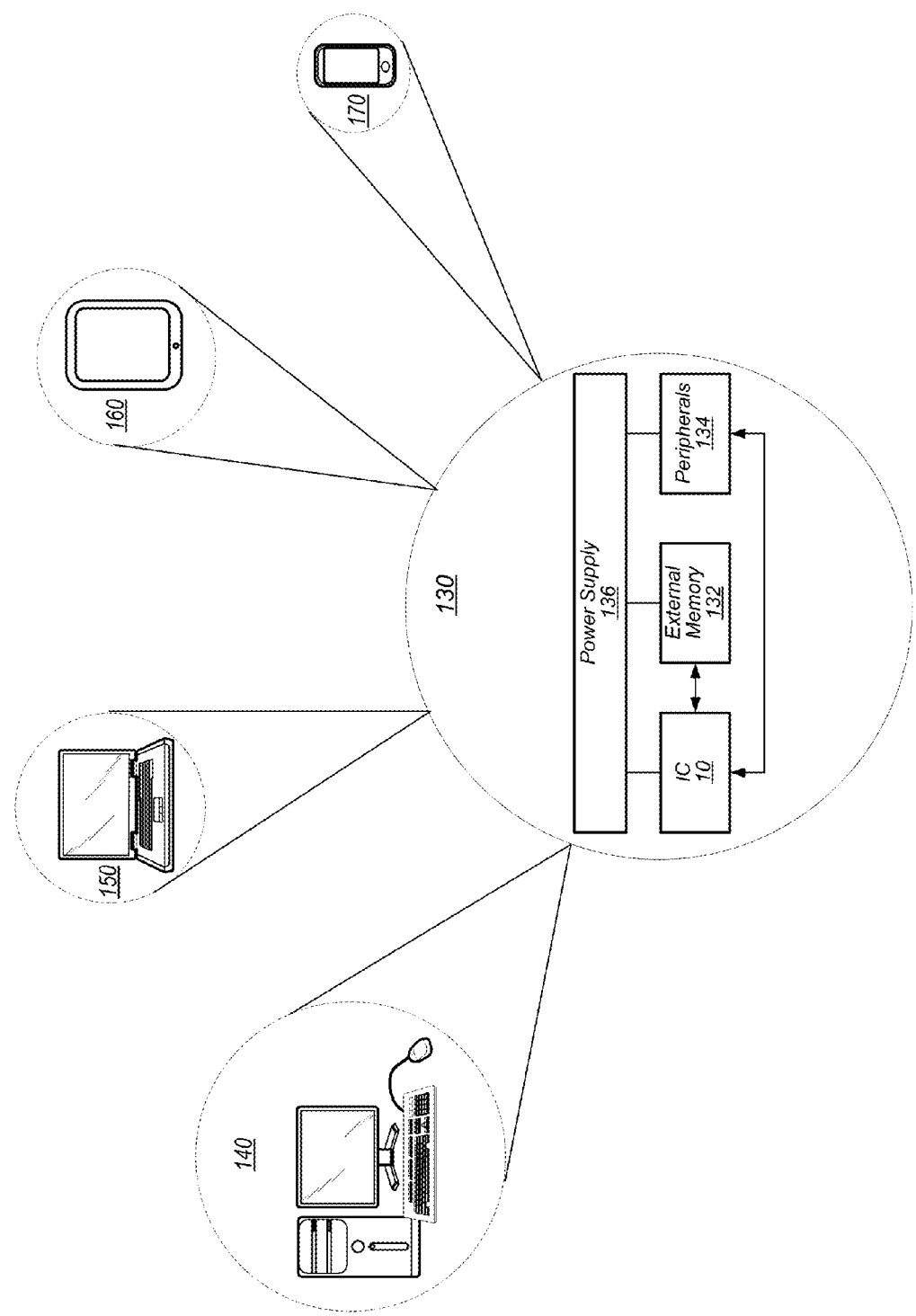
FIG. 7 is a block diagram of one embodiment of a system.

Referring next to FIG. 7, a block diagram of one embodiment of a system 130 is shown. As shown, system 130 may represent chip, circuitry, components, etc., of a desktop computer 140, laptop computer 150, tablet computer 160, cell phone 170, or otherwise. In the illustrated embodiment, the system 130 includes at least one instance of IC 10 (of FIG. 1) coupled to an external memory 132.

IC 10 is coupled to one or more peripherals 134 and the external memory 132. A power supply 136 is also provided which supplies the supply voltages to IC 10 as well as one or more supply voltages to the memory 132 and/or the peripherals 134. In various embodiments, power supply 136 may represent a battery (e.g., a rechargeable battery in a smart phone, laptop or tablet computer). In some embodiments, more than one instance of IC 10 may be included (and more than one external memory 132 may be included as well).

The memory 132 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with IC 10 in a chip-on-chip configuration, a package-on-package configuration, or a multi-chip module configuration.

The peripherals 134 may include any desired circuitry, depending on the type of system 130. For example, in one embodiment, peripherals 134 may include devices for various types of wireless communication, such as wifi, Bluetooth, cellular, global positioning system, etc. The peripherals 134 may also include additional storage, including RAM storage, solid state storage, or disk storage. The peripherals 134 may include user interface devices such as a display screen, including touch display screens or multitouch display screens, keyboard or other input devices, microphones, speakers, etc.

Figure 8:
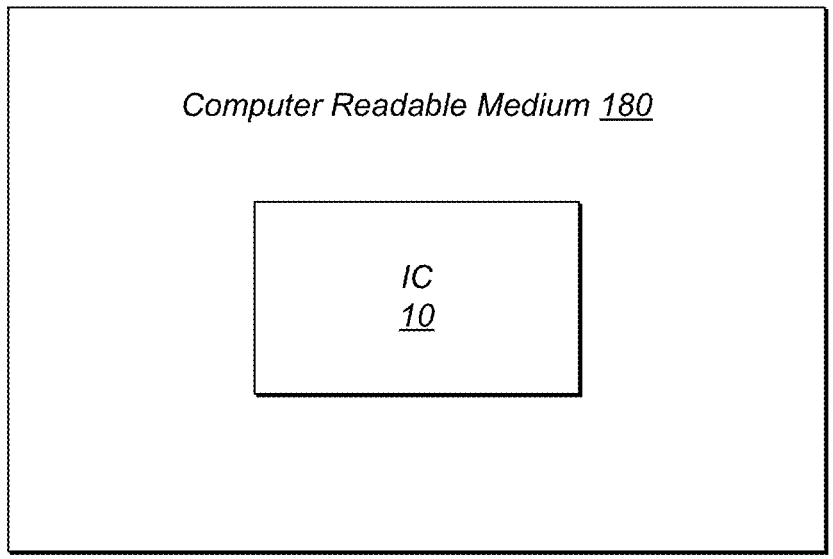
FIG. 8 is a block diagram of one embodiment of a computer readable medium.

Turning now to FIG. 8, one embodiment of a block diagram of a computer readable medium 180 including one or more data structures representative of the circuitry included in IC 10 (of FIG. 1) is shown. Generally speaking, computer readable medium 180 may include any non-transitory storage media such as magnetic or optical media, e.g., disk, CD-ROM, or DVD-ROM, volatile or non-volatile memory media such as RAM (e.g. SDRAM, RDRAM, SRAM, etc.), ROM, etc., as well as media accessible via transmission media or signals such as electrical, electromagnetic, or digital signals, conveyed via a communication medium such as a network and/or a wireless link.

Generally, the data structure(s) of the circuitry on the computer readable medium 180 may be read by a program and used, directly or indirectly, to fabricate the hardware comprising the circuitry. For example, the data structure(s) may include one or more behavioral-level descriptions or register-transfer level (RTL) descriptions of the hardware functionality in a high level design language (HDL) such as Verilog or VHDL.

The description(s) may be read by a synthesis tool which may synthesize the description to produce one or more netlists comprising lists of gates from a synthesis library. The netlist(s) comprise a set of gates which also represent the functionality of the hardware comprising the circuitry. The netlist(s) may then be placed and routed to produce one or more data sets describing geometric shapes to be applied to masks. The masks may then be used in various semiconductor fabrication steps to produce a semiconductor circuit or circuits corresponding to the circuitry. Alternatively, the data structure(s) on computer readable medium 180 may be the netlist(s) (with or without the synthesis library) or the data set(s), as desired. In yet another alternative, the data structures may comprise the output of a schematic program, or netlist(s) or data set(s) derived therefrom.

While computer readable medium 180 includes a representation of IC 10, other embodiments may include a representation of any portion or combination of portions of IC 10 (e.g., core interface unit, load/store unit).

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
   a memory subsystem; and
   control circuitry;
   wherein the control circuitry is configured to convert a memory access operation into a prefetch request responsive to detecting that a pending barrier operation is preventing the memory access operation from accessing a lower level of the memory subsystem.

2. The apparatus as recited in claim 1, wherein the memory subsystem comprises at least a level one (L1) cache and a level two (L2) cache.

3. The apparatus as recited in claim 2, wherein the control circuitry is further configured to:
   convey the prefetch request to the L2 cache; and
   store data corresponding to the prefetch request in the L1 cache.

4. The apparatus as recited in claim 1, wherein the control circuitry comprises a request queue, and wherein the control circuitry is further configured to store the memory access operation in the request queue until the barrier operation retires.

5. The apparatus as recited in claim 4, wherein the control circuitry is configured to select operations from the request queue in order.

6. The apparatus as recited in claim 1, wherein the barrier operation is a data memory barrier (DMB) or a data synchronization barrier (DSB).

7. The apparatus as recited in claim 1, wherein the control circuitry is further configured to convert multiple memory access operations into multiple prefetch requests in parallel.

8. A processor comprising:
   a load/store unit;
   a level one (L1) cache;
   a level two (L2) cache; and
   a core interface unit;
   wherein the load/store unit is configured to:
      detect a miss in the L1 cache for a memory access operation;
      convey the memory access operation to the core interface unit;
   wherein the core interface unit is configured to:
      receive and enqueue the memory access operation;
      convert the memory access operation into a prefetch request in response to detecting the memory access operation is being prevented from accessing the L2 cache due to a pending barrier operation; and
      convey the prefetch request to the L2 cache.

9. The processor as recited in claim 8, wherein the memory access operation is a load operation or a store operation.

10. The processor as recited in claim 8, wherein the core interface unit is further configured to restart the memory access operation in response to detecting the pending barrier operation has retired.

11. The processor as recited in claim 8, wherein the L1 cache comprises a data cache, and wherein the data cache is located in the load/store unit.

12. The processor as recited in claim 8, wherein the load/store unit is further configured to convey a given barrier operation to the core interface unit.

13. The processor as recited in claim 12, wherein the load/store unit is further configured to wait until all older memory access operations have been completed in the load/store unit before conveying the given barrier operation to the core interface unit.

14. The processor as recited in claim 12, wherein the load/store unit is further configured to wait until the given barrier operation becomes non-speculative before conveying the given barrier operation to the core interface unit.

15. A method comprising:
   detecting a barrier operation;
   detecting a memory access operation that has missed in a level one (L1) cache, wherein the memory access operation is younger than the barrier operation;
   transforming the memory access operation into a prefetch request, responsive to determining the memory barrier operation has not been retired; and
   conveying the prefetch request to a level two (L2) cache.

16. The method as recited in claim 15, wherein the memory access operation is a load operation, the method further comprising:
   retrieving data corresponding to the load operation from the L2 cache; and
   storing the retrieved data in the L1 cache, wherein the retrieved data is stored in a shared state.

17. The method as recited in claim 15, further comprising restarting the memory access operation responsive to the barrier operation retiring.

18. The method as recited in claim 15, wherein the barrier operation is detected in a load/store unit, the method further comprising conveying the barrier operation from the load/store unit to a core interface unit.

19. The method as recited in claim 18, further comprising enqueuing the barrier operation in the core interface unit.

20. The method as recited in claim 19, further comprising conveying the barrier operation from the core interface unit to the L2 cache.

* * * * *